Patented June 15, 1943

2,321,623

UNITED STATES PATENT OFFICE 2,321,623

TREATING ANIMAL TISSUE

John M. Ramsbottom and Levi S. Paddock, Chicago, Ill., assignors to Industrial Patents Corporation, Chicago, Ill., a corporation of Delaware No Drawing. Application March 10, 1941, Serial No. 382,590

29 Claims. (Cl. 99—107)

This invention relates to the treatment of animal tissues and has to do particularly with the treatment of flesh and intestines with plant enzymic material to improve the value thereof.

One of the objects of this invention is to provide a method whereby animal tissue may be rendered tender and improved in other properties.

Another object of this invention is to provide a method whereby the flesh of edible animal carcasses may be rendered tender.

Another object of this invention is to provide a method whereby animal intestines may be rendered tender and more adaptable for use as sausage casings.

Another object of this invention is to provide a method of treating natural sausage casings to increase the stretchability of the casings and to increase the stuffing capacity of the casings.

Another object of this invention is to provide a method whereby the smoking properties of the casings may be altered.

Another object of the invention is to provide a method whereby such tough casings as hog casings and Indian sheep casings may be tendered to any desired extent and rendered useful in the manufacture of high grade sausage products which require a tender casing.

Other objects and advantages of this invention will become apparent from the description and claims which follow.

The process is applicable to the treatment of various types of animal tissue, such as wholesale or retail cuts of meat, including beef and pork. It is also applicable to the treatment of meat in various degrees of comminution, such as hamburger, sausage and the like. The treatment of sausage may take place before or after the meat is stuffed into casings.

The invention is particularly adaptable to the treatment of hog casings, Indian sheep casings, and beef casings although it is not limited to the treatment of these specific types of materials.

Natural casings, as distinguished from artificial or synthetic casings, are prepared from the intestines of edible animals, such as cattle, swine and sheep. After the intestines are removed from the carcass, they are cleaned and a tubular membrane appropriate for sausage casings is obtained.

Sheep casings command a higher price because they generally possess more desirable physical properties than hog casings, Indian sheep casings and beef casings. Hog casings are suited for the manufacture of frankfurters and other sausages similar in size, but because of physical characteristics they cannot be successfully used in the manufacture of high grade frankfurters and fresh pork sausages because the casing is objectionable, being difficult to masticate. The same is true of Indian sheep casings and beef casings. Moreover, the casing is the most difficult part of the sausage to digest, and it is also highly desirable to have a casing possessing a greater stretchability so that the ratio of casing to sausage meat may be reduced to as low a point as possible.

The present invention contemplates the treatment of animal tissue including natural casings prepared from animal intestines with a solution of a proteolytic enzyme obtained from a plant, such as plant juice or extract containing a proteolytic enzyme, and controlling the action of the plant enzyme on the tissue in such a way that the desired physical properties of the tissue are improved efficiently and quickly without undue digestion or other undesirable effects.

We are aware that it has been proposed heretofore to treat meat with certain enzymes to obtain tendering. For example, the patent to Paddock, et al., United States Patent No. 2,043,392, discloses the injection of proteolytic enzymes into the vascular system of carcass beef and then holding the treated product under refrigeration. There is no disclosure in that patent of treating natural casings with an enzyme nor the treatment of animal tissue under the conditions of the present invention whereby applicants' results could be obtained. The patent to Marcano, United States Patent No. 441,181, discloses the preparation of a meat peptone in which the meat is completely disintegrated into a liquid or soluble pasty form. The Marcano patent has no disclosure of tendering any kind of animal tissue.

According to the present invention, animal tissue is treated with a plant proteolytice enzyme solution under conditions of treatment including strength of the plant enzymic solution, temperature, and time, coupled with steps of operation whereby new and different results from the prior art are obtained.

The proteolytic enzymes and their solutions are generally prepared from fresh or frozen enzymic plant juices or extracts, which have not been subjected to a temperature sufficiently high to destroy the enzymic action. Included among the plant juices and the corresponding proteolytic plant enzymes which may be employed in the present process are milkweed juice containing asclepain, papaya juice containing papain, pineapple juice containing bromelin, fig juice containing ficin, osage orange juice containing macin and mushroom juice containing mushroom proteolytic enzyme. The natural plant juices containing a proteolytic enzyme and/or mixtures thereof are usually employed in preparing the treating solution, but other solutions of the plant proteolytic enzyme or enzymes can be used. Solutions containing about 1 part of enzymic plant juice to about 5 or 6 parts or more of water are often used under the conditions of treatment herein specified, although satisfactory results may be obtained by using undiluted extracts or extracts diluted with water up to about 200 parts of water. The concentrations vary with the nature of the tissue treated, the activity and type of enzyme employed, and the other conditions such as time, temperature and method of operation.

The enzymic juice or extract may be obtained by pressing the fruit in the case of the pineapple, osage orange, papaya and fig enzymes. The mushroom enzyme juice may be obtained by pressing the plant. The milkweed, osage orange, papaya and fig enzyme extract may be recovered by pressing the fresh leaves, stems, stalks and sap wood of these plants. The proteolytic plant enzyme may be isolated from the appropriate juice or extract source by any method suitable for the isolation of a proteolytic enzyme. These methods include precipitation with ethyl alcohol, acetone, methyl alcohol, salts and the like. Solutions containing the natural proteolytic plant enzyme juice, for example papaya juice, milkweed juice and/or pineapple juice, in concentrations of a fraction of a percent to 100% may be satisfactorily employed. Corresponding solutions of the isolated enzyme may contain as low as 0.002% of the enzyme or even lower, and as high as 5% or more of the enzyme. For example, a solution containing preparations of about 0.005% to 0.05% of the enzyme is generally satisfactory, although solutions containing active plant enzymes in larger amounts, for example 0.05% to 0.5% or more are contemplated for our use. Solutions of the lower range are usually used for treating meat. Solutions of the higher range, approximately 10 times the concentration for tenderizing meat, are more satisfactory for treating intestinal tissue, such as natural casings.

In the use of solutions of the plant enzymes it has been found that these proteolytic enzymes are generally most active when employed in a solution having a hydrogen ion concentration approximating that of the extract or juice. However, these enzymes are active when used in solutions varying over a wide range of hydrogen ion concentrations, e. g., a pH between about 3 or 4 and 8.5. It is advantageous to maintain the pH value below 7 for maximum enzyme activity, for advantages in dye absorption by the products, and, particularly, for treating meat and stuffed sausages in order to avoid an alkaline reaction on the meat which would stimulate undesirable bacterial growth.

The natural juice or other solution of proteolytic plant enzymes may be applied to the tissue in any suitable manner as by washing, soaking, injecting, spraying, dipping or wiping.

It will be understood that the time of treatment, the temperature of treatment, and the concentration and activity of the solution are all variable and should be adjusted to secure the desired extent of tendering, which is dependent upon the type and the initial toughness of the tissue. The activity of the proteolytic plant enzyme increases with increasing temperature until a condition of greatest activity is generally reached at temperatures between about 140° and 160° F. The enzyme activity is destroyed at a temperature between about 160° and 185° F. These temperatures vary slightly with the different enzymes. For example, papain or papaya juice is operative at slightly higher temperatures, e. g., 175° F., whereas the mushroom enzyme may sometimes be inactivated at temperatures of about 150° to 160° F.

The product previously treated with the enzyme by any of the methods described hereinbefore is subjected to a temperature within the range of enzyme activity but above refrigeration temperatures, preferably between 60° and 140° F. and maintained at such temperature in contact with the previously applied proteolytic enzyme for a sufficient length of time to permit the enzyme to act upon the tissue, whereby the desired alteration in physical properties is effected. The temperature may then be raised to a point sufficiently high, for example, to a temperature between about 165° and 185° F. to inactivate the enzyme and avoid excessive action on the tissue. As an alternative method, the treated product may be thoroughly flushed with water before or after the final heat treatment to remove the major portion of the enzymatic material. The action of the enzyme may be terminated by other means than heating or washing, such as the application of a suitable chemical reagent.

In the treatment of meat tissue the enzyme solution may be applied to the meat by any of the foregoing methods. The previously treated meat is then held at a temperature of above about 60° F. and within the range of enzymic activity until the desired degree of tenderization takes place. The temperature of the meat is then raised to a point at which the treating enzyme is substantially inactivated. This tenderization process may be accomplished by gradually heating the meat to which the enzyme has been applied from room temperature to cooking temperature and finally enzyme inactivation temperature. The temperature rise through the gradient is at such a rate that the meat is tenderized by the enzyme in its active range. When the desired degree of tendering results, the temperature is substantially raised to stop further enzymic action. The type, toughness and size of the meat cut, and the quantity and activity of the enzyme, determine the time and temperature of heat treating.

As an illustration of the tenderizing of meat by this process, a normally tough muscle from the hind shank of the right side of a beef carcass (peroneus tertius) was treated with an enzyme solution containing preparations of about 0.012% asclepain, 0.012% papain, 0.008% ficin, 0.015% macin, 0.035% bromelin or 2% mushroom enzyme by injecting the solution into the primary artery supplying the circulatory system of the cut. The amount of enzyme solution injected was about 8% of the muscle weight. An enzyme-treated right side muscle and a non-treated control left side muscle were cut into slices about one-half inch thick. These slices were heated gradually from room temperature to a temperature of about 160° F. in about 10 to 15 minutes. The enzyme was then inactivated by quickly raising the temperature substantially above this value. The cooked, treated product was compared with the cooked control. In all cases the treated muscle slices were tender whereas the control muscle slices were tough.

It is possible to similarly prepare treated beef rounds to obtain steaks and roasts which when heat treated first in the active enzyme temperature range followed by a high heat treatment to inactivate the enzyme will yield cooked cuts substantially more tender than those not so treated with enzymes. In all these treatments the steaks and roasts are fried, broiled or roasted to an inside temperature of at least 160° F. and tenderness comparisons made on the cooked meat. Of course with these larger cuts longer periods of treatment, for example, up to 1 hour or more, are generally necessary in order to raise the temperature throughout the meat, through the active enzyme range.

In treating the beef rounds the enzyme solution alternatively may be introduced into the cut by means of hypodermic needles until the desired amount of enzyme solution based on the weight of muscle is obtained. For example, an aqueous solution containing preparations of about 0.012% asclepain, 0.05% mushroom enzyme, 0.012% papain, 0.005% ficin, 0.015% macin, or about 0.035% bromelin or an equivalent dilute plant juice may be injected by needles into the cuts of meat or into the circulatory system of a meat cut or a carcass in an amount equal to about 6% of the weight of the meat to prepare it for the heat tenderizing treatment.

In the treatment of sausage casings, the natural juice or other solution of proteolytic plant enzyme may be applied to the casing in any suitable manner as by washing or soaking the casings in the solution, adding the enzyme or juice to the sausage cook water or spraying, dipping or wiping the casing with the enzyme solution or juice after the casing has been stuffed with sausage meat. The casing may be treated, however, before or after stuffing and greater improvement in stretchability is sometimes obtained by treatment before stuffing.

The casing with the applied enzyme may be heated to a temperature above about 60° F., for example, between about 110° and 140° F., and maintained at such temperature for a sufficient length of time to permit the enzyme to attack the tissue to the desired extent, e. g., ½ to 3 hours. The temperature is then raised to a point high enough to destroy the major portion of the enzyme and avoid excessive action on the casing. The improvement of the stuffed casing by this enzymic action is preferably accomplished in two steps; a conditioning of the stuffed casing at a lower temperature, e. g., 80° to 90° F., followed by the smoking of the stuffed casing at a higher temperature, after which the enzyme is inactivated, e. g., by cooking. In some instances it may be desirable to omit the separate tempering or conditioning step and to secure the conditioning and smoking in a single operation. When the conditioning and smoking take place in one operation the temperature in the smoke house may be raised through a wide range, at least a portion of which is in the field of enzymic activity, and the temperature rise through this gradient may be rather slow.

The present invention may be practiced by treating the casings after stuffing as well as before stuffing. In the treatment of casings after stuffing, basins or receptacles may be placed at the end of a conventional stuffing table. One basin is equipped with an overflow and warm water is passed continuously through the basin; the other basin may serve as a receptacle for the juice or juices or other solution of proteolytic plant enzyme or enzymes. A satisfactory aqueous solution may be prepared containing preparations of about 0.12% asclepain, 0.12% papain, 0.08% ficin, 0.15% macin, or 0.5% mushroom enzyme, or an equivalent quantity of plant juice, e. g., 15% pineapple juice. The concentration and activity of the solution will vary with the type of casing which is to be treated but the above values are good for average production. The enzyme solution is then placed in the proper receptacle. After the sausages are stuffed and linked, the operator dips the sausages in the warm running water basin, immersing the sausages 2 or 3 times to rinse off particles of meat from the surface of the casings. The sausages are then immersed 2 or 3 times in the enzyme solution, care being taken to have the solution reach all portions of the outside surface of the casings. In the commercial treatment of natural casings, we prefer to spray the stuffed casings with one of the foregoing aqueous enzyme solutions containing about 0.1% papain, ficin or asclepain, 0.5% mushroom juice enzyme, or about 0.35% bromelin.

It will be understood, of course, that the time of treatment, the temperature of treatment, and the concentration and activity of the solution are all variable and may be adjusted at will to secure the desired alterations in the physical properties of the casings, and are dependent upon the use to which the casings are to be put and the initial properties of the casings.

After the application of one of the enzyme solutions by any of the foregoing methods, the product with the enzyme or enzymes thereon may be placed in a tempering room for a period of about 1 hour and 30 minutes with an air temperature of from 80° to 120° F., preferably about 80° to 90° F., and a relative humidity of about 80% to 85%. The product is then removed to a preheated smoke house having temperatures sufficiently high to cure the product, for example, at a temperature of from 120° to 170° F. The product is usually kept in the smoke house for about 45 minutes up to 1 or 2 hours, during which time a gradual increase in temperature from about 120° to 150° or 160° F. may be obtained over a period of about 1½ hours. The air temperature, if desired, may then be raised to 170° to 200° F., for example, to a temperature of about 170° F. and maintained at this temperature for about 15 minutes. Preferably after the curing operation, the product may be cooked in water or steam in which case it is desirable not to exceed a temperature of about 180° F. The preferred cooking treatment, however, is to place the frame with the smoked sausage links in a cooking chamber where the sausages are sprayed with hot water at a temperature of about 170° F. for about 12 to 15 minutes, thereby inactivating and removing the enzymes. A direct steam chamber at the same temperature may be employed.

The treatment of natural casings according to the present invention produces a product of greatly improved tenderness. For example, ordinary untreated casings are often so tough that it is difficult to break or puncture a stuffed sausage by bending, biting, chewing or pulling, whereas the casings treated by the present invention are easily broken by bending and may be readily punctured by gentle pressure with a finger or thumb.

The improvement in and uniformity of tenderness of the treated casings may be more precisely shown by penetrometer measurements of the force necessary to puncture a sausage casing. The penetrometer consists of a steel ball having a diameter of 1/16" mounted upon a rod having a smaller diameter which is attached to a pressure gauge. A measure of the toughness of the casing may be obtained by puncturing the stuffed casing with the steel ball. In the particular penetrometer employed in testing the sausage casings, the scale was calibrated in one-twentieths of a pound. The following data illustrate representative penetrometer readings obtained by puncturing untreated casings and treated casings prepared as described above, employing the pineapple juice diluted with about 6 parts of water:

| Untreated casings | Treated casings |
|---|---|
| Penetrometer reading | Penetrometer reading |
| 92 | 54 |
| 74 | 56 |
| 88 | 63 |
| 86 | 53 |
| 75 | 63 |
| 84 | 56 |

The deviation in penetrometer readings of the untreated casings was 18 whereas the deviation in the case of the treated casings was 10. The data represent quite clearly that the treatment of the casings results in a far more uniform as well as tenderer product. By way of further interpretation of the above data on penetrometer tests, it will be noted that the average reading for untreated casings is 83.16, whereas the average reading for treated casings is 57.5. Calculated in percentage, the resistance to penetration by the 1/16-inch diameter steel ball was about 31% less for the treated casings than for the untreated casings. In other words, the sausages with treated casings offered about one-third less resistance to penetration by the ball than like sausages having untreated casings.

In a more comprehensive test of other groups of casings similar results were obtained. In a statistical analysis of these data, it was found that the standard deviation between treated casings is about one-half as great as the standard deviation between untreated casings. The following table illustrates the results obtained in tests of 140 samples of treated casings and untreated casings:

| No. of samples | Character of samples | Average reading | Standard deviation |
|---|---|---|---|
| 140 | Treated | 75.7 | 11.9 |
| 140 | Untreated | 122.2 | 22.8 |

If the resistance to penetration is calculated on the basis of the above average readings, it will be found that the treated casings offered about 38% less resistance to penetration than similar untreated casings. Again, the treated casings were roughly about one-third less resistant to penetration than untreated casings graded to the same size.

The process of the present invention also produces other improved properties in the treated casing. Among these are increased translucency and improved smoking properties. These improved properties appear to be due at least in part to an increased quantity of water absorbed by the casing. The treatment of a casing with pineapple juice or a dilute aqueous solution of bromelin produces a noticeable tendency for the casing to swell accompanied by a marked increase in the amount of water absorbed by the casing. As a result, smoke penetrates the wet surface more rapidly and to a greater extent than the drier surface of an ordinary casing. Moreover, the casing dries out more slowly than an untreated casing and, as a result, provides a longer effective smoke period due to the more rapid and continued penetration of the smoke.

The increase in the water absorbing property of treated casings as compared to untreated casings may be illustrated by the data given below. Casings graded to the same size were selected, one group being handled in the normal conventional manner, the other group being treated in accordance with the present invention. In the treatment of the casings in accordance with conventional practice, the salted casings were soaked in water to remove the salt and were then flushed with water. The other group of casings was soaked in water for about 30 minutes to remove the salt, treated with a pineapple juice solution consisting of about 1 part of pineapple juice to 6 parts of water, held in contact with the applied enzyme at a temperature of from 70° to 75° F. for about 2 hours, and then flushed with water. The percentage gain in weight of the treated and untreated casings was found to be as follows:

| Untreated casings, percent gain | Treated casings, percent gain |
|---|---|
| 42 | 88 |
| 38 | 114 |
| 35 | 102 |
| 28 | 72 |
| 33 | 75 |
| 33 | 71 |
| Average 35 | 87 |

Thus, it is evident from the foregoing average percentages that the treated casings absorbed about 52% more water than the untreated casings, or stated another way, about 2½ times as much water.

Furthermore, the treatment of natural casings in accordance with our invention increases the stretchability of the casings and thereby increases the stuffing capacity of the casings. In the data which follow, casings graded to the same size were handled as described above to prepare the casings for stuffing. All of the casings were then subjected to the identical stuffing operation, and, after stuffing, the diameter of the casings was measured. Each of the figures in the table which follows represents the average diameter of sausage prepared from a bundle of casings, each of the bundles containing 102 yards of casing.

| Untreated casings | Treated casings |
|---|---|
| Mm. | Mm. |
| 28.1 | 31.2 |
| 28.5 | 30.7 |
| 28.5 | 31.1 |
| Average 28.4 | 31.0 |

The sausages were also weighed to obtain the weight of sausage meat. The data in the table which follows represent the weight of the stuffed casing per standard bundle of 102 yards of casing.

| Untreated casings | Treated casings |
|---|---|
| *Pounds* | *Pounds* |
| 105.0 | 110.5 |
| 107.5 | 120.0 |
| 92.0 | 112.0 |
| Average.. 101.8 | 114.2 |

The increase in stuffing capacity in the foregoing groups of casings was approximately 11%. The increase in stuffing capacity will, in general, vary from about 8% to about 15%, depending upon the characteristics of the casings, concentration of the juice used, and upon the length of the period of treatment of the casings. The above data illustrate a representative increase in the stretchability and stuffing capacity of casings treated in accordance with this invention.

The treatment of the casings with the proteolytic plant juice or other aqueous solution of proteolytic plant enzymes renders the casings more slippery than conventional casings. Before stuffing, casings are placed upon or threaded on a stuffing horn and it is desirable to have the casing as slippery as possible so that it may be easily threaded on the stuffing horn. In conventional practice, a water connection is provided on the stuffing table and the operator places the casing over the water nozzle and admits a small amount of water prior to threading the casing upon the stuffing horn. Casings treated in accordance with our invention may be placed on the stuffing horn without first admitting a small amount of water to the casing.

The dye absorption properties of the casings are also improved by the present process in that the casings require a smaller concentration of dye to produce the same intensity of color as compared to untreated casings. This is important when the product is labeled by stamping using a dye for the purpose.

This application is a continuation in part of our application, Serial No. 301,957, filed October 30, 1939, which application is a continuation in part of our application, Serial No. 225,566, filed August 18, 1938.

Obviously many modifications and variations of the invention hereinbefore set forth may be made without departing from the spirit and scope thereof, and therefore only such limitations should be imposed as are indicated in the appended claims.

We claim:

1. A process for tenderizing animal tissue which comprises the steps of: subjecting the tissue to treatment with a proteolytic enzyme capable of tenderizing said tissue while maintaining a temperature within a range of active enzymic action for a period of time sufficient to allow enzymic action of the enzyme upon said tissue to substantially tender the same, but insufficient to cause material disintegration of said tissue; and then arresting the action of said enzyme to prevent further disintegration of said tissue.

2. The process as defined in claim 1 in which the animal tissue comprises natural animal casings.

3. The process as defined in claim 1 in which the tissue comprises naturally tough animal casings.

4. The process defined in claim 1, in which the proteolytic enzyme is of plant origin.

5. The process defined in claim 1, in which the proteolytic enzyme is the plant enzyme papain.

6. The process defined in claim 1, in which the proteolytic enzyme is derived from the mushroom plant.

7. The process defined in claim 1, in which the proteolytic enzyme is the plant enzyme asclepain.

8. The process as defined in claim 1 in which the enzymic action is arrested by an elevation in temperature to a point above the inactivating temperature of the enzyme.

9. A process for tenderizing animal tissue which comprises the steps of: subjecting the tissue to treatment with a non-alkaline solution of a proteolytic enzyme of sufficient strength to cause tenderization of the tissue while maintaining a temperature above 60° F. but below the inactivating temperature of the enzyme for a period of time sufficient to allow action of the enzyme upon said tissue to substantially tender the same, but insufficient to cause material disintegration of said tissue; and then arresting the action of said enzyme to prevent further disintegration of said tissue.

10. The process defined in claim 9, in which the animal tissue comprises natural animal casings.

11. The process defined in claim 9, in which the solution of the proteolytic enzyme contains papaya juice.

12. The process defined in claim 9, in which the solution of proteolytic enzyme contains milkweed juice.

13. The process defined in claim 9, in which the solution of proteolytic enzyme contains mushroom juice.

14. The process as defined in claim 9 in which the solution of proteolytic enzyme is an aqueous solution containing about 0.002% to 5% of a plant enzyme.

15. A process for tenderizing natural casings which comprises the steps of: applying an aqueous solution containing about 0.12% papain to natural casings; subjecting the treated casings to a temperature between 60° F. to 140° F. for a period of about 30 to 180 minutes to allow enzymic action of the enzyme upon said casings to substantially tender the same; and then arresting the action of said enzyme to prevent further disintegration of said tissue by subjecting the tenderized casings to a temperature between 165° F. to 185° F. for at least several minutes.

16. In a process for the treatment of sausages stuffed in natural casings normally tending to be tough in order to substantially tenderize said casings, the steps of: contacting the sausages with a proteolytic enzyme material capable of tenderizing the tissue of said casings; and then subjecting said sausages to a temperature between 60° F. and the inactivating temperature of the enzyme material for a period of time sufficient to substantially tender the tissue of said casings, but insufficient to cause material disintegration of the tissue of said casings.

17. The process defined in claim 16, in which the proteolytic enzyme material is an aqueous solution containing 0.002% to 5% of the enzyme.

18. A process for the manufacture of sausage in natural casings which comprises the steps of: subjecting said casings to treatment with a solution containing a proteolytic enzyme capable of tendering the tissue of said casings while maintaining a temperature above 60° F. but below the inactivating temperature of the enzyme for a period of time at least sufficient to allow action of the enzyme upon said casings to substantially tender said casings, but insufficient to cause material disintegration of said casings; and immediately thereafter smoking and cooking the treated product at a temperature in a range above the inactivating temperature of the enzyme to arrest the action of the enzyme upon the tenderized casings.

19. A process for the treatment of sausages stuffed in natural casings to substantially tenderize said casings, which comprises the steps of: applying to the casings of the sausages a proteolytic enzyme material capable of tenderizing said casings; placing the treated sausages in a tempering room and subjecting the same to air having a temperature of about 60° F. to 140° F. for a period of 30 to 180 minutes to substantially tenderize the casings without effecting material disintegration thereof; removing the hot tenderized sausages from said tempering room and placing the same in a preheated smoke house; raising the temperature in said smoke house from about 120° F. to 160° F. in about 45 to 120 minutes; and then arresting the action of the enzyme and cooking the smoked sausages by subjecting the same to a temperature of about 170° F. to 200° F. for a period of about 15 minutes.

20. The process defined in claim 19, in which the enzyme material is applied to the sausages by spraying.

21. The process defined in claim 19, in which the inactivation of the enzyme and cooking of the sausages is effected by spraying hot water at a temperature of about 180° F. upon the sausages to arrest the enzymic action and to remove the enzyme material from the sausages.

22. A process for the treatment of sausages in natural casings to substantially tenderize said casings, which comprises the steps of: applying to the casings of the sausages a proteolytic enzyme material capable of tenderizing said casings; placing the treated sausages in a tempering room and subjecting the same to air having a temperature of about 80° F. to 120° F. for a period of about 90 minutes to at least partially tenderize the casings; removing the hot tenderized sausages from said tempering room and placing the same in a preheated smoke house; raising the temperature in said smoke house from about 120° F. to 160° F. in about 45 to 120 minutes; and then arresting the action of the enzyme and cooking the smoked sausages by subjecting the same to a temperature of about 170° F. to 200° F. for a period of about 15 minutes.

23. A process for the treatment of sausages in natural casings to substantially tenderize said casings, which comprises the steps of: applying to the casings of the sausages a proteolytic enzyme material capable of tenderizing said casings; subjecting the treated sausages to air having a temperature of 60° F. to 140° F. for a period of 30 to 180 minutes; and then respectively smoking and cooking the sausages at a temperature of 165° F. to 185° F., whereby to simultaneously arrest the action of the enzyme material while said smoking and cooking is being effected.

24. A process for the treatment of sausages in natural casings to substantially tenderize said casings, which comprises the steps of: applying to the casings of the sausages a proteolytic enzyme material capable of tenderizing said casings; placing the treated sausages in a tempering room and subjecting the same to air having a temperature of about 60° F. to 140° F. for a period of 30 to 180 minutes to substantially tenderize the casings without effecting material disintegration thereof; maintaining a relative humidity of about 80 to 85% in said tempering room to prevent substantial dehydration of said sausages; removing the hot tenderized sausages from said tempering room and placing the same in a preheated smoke house; raising the temperature in said smoke house from about 120° F. to 160° F. in about 45 to 120 minutes; and then arresting the action of the enzyme and cooking the smoked sausages by subjecting the same to a temperature of about 170° F. to 200° F. for a period of about 15 minutes.

25. The process as defined in claim 1 in which the enzymic action is arrested by an elevation in temperature to an inactivating temperature of at least 160° F.

26. The process as defined in claim 1 in which the enzymic action is arrested by an elevation in temperature to an inactivating temperature of 160° F. to 185° F.

27. The process as defined in claim 1, in which the enzyme action is chemically arrested.

28. The process as defined in claim 1, in which the action of the enzyme is arrested by the removal of a substantial portion of the enzymic material.

29. A process for tenderizing animal tissues which comprises the steps of: contacting the animal tissues with a proteolytic enzyme material capable of tendering said tissues and then subjecting said tissues to a temperature between 60° F. and the inactivating temperature of the enzyme material for a period of time sufficient to substantially tender said tissues but insufficient to cause material disintegration of said tissues.

JOHN M. RAMSBOTTOM.
LEVI S. PADDOCK.